H. COOPER.
SHOCK ABSORBING SHAFT.
APPLICATION FILED FEB. 29, 1912. RENEWED JUNE 13, 1916.
1,218,929.
Patented Mar. 13, 1917.
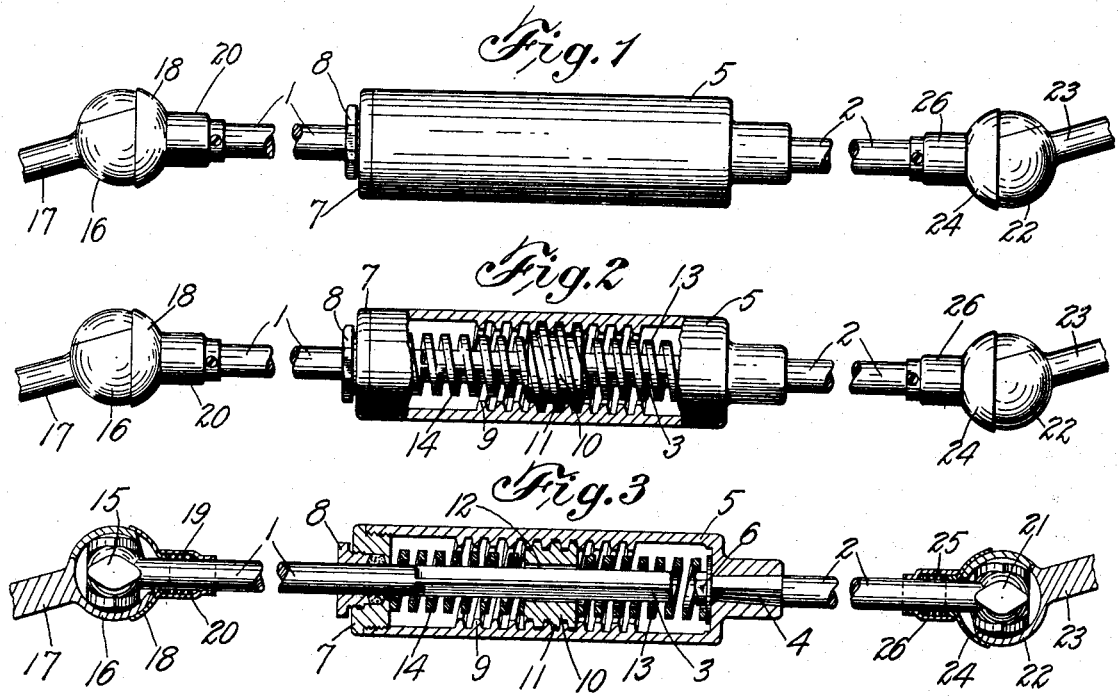
Attest
Frank H Vick Jr.
Alice Murphy
Inventor
Herbert Cooper, by
Sydney P. Prescott, Atty.

UNITED STATES PATENT OFFICE.

HERBERT COOPER, OF BROOKLYN, NEW YORK.

SHOCK-ABSORBING SHAFT.

1,218,929.  Specification of Letters Patent.  Patented Mar. 13, 1917.

Application filed February 29, 1912, Serial No. 680,583. Renewed June 13, 1916. Serial No. 103,589.

*To all whom it may concern:*

Be it known that I, HERBERT COOPER, a citizen of the United States, residing at Brooklyn, county of Kings, and State of New York have invented a new and useful Improvement in Shock-Absorbing Shafts, of which the following is a specification.

This invention relates to a shock absorbing shaft; that is to say, an element in a system of shafting which is capable of absorbing shock due to sudden changes in the relative speed of elements of the system between which the shock absorbing shaft is positioned, and particularly to what is known as the propeller shaft of automobiles driven by internal combustion engines.

Heretofore, in shaft driven automobiles, it has been customary to connect the motor, or transmission gearing, with the differential gearing operating to drive the rear wheels, by means of what is known as a propeller shaft. It is well known that an internal combustion engine must be running at considerable speed before it can be connected to drive the differential gearing of an automobile, and that, when the clutch is thrown in, the mechanism between the motor and the driving wheels is subjected to stresses far in excess of the stress under normal load conditions. Similar stresses occur when the transmission gearing is operated to change the relative speed of the motor and the differential gearing. Similar stresses occur also when the emergency brakes are suddenly applied. The main object of the present invention is the production of what may be termed a shock absorbing shaft, capable of use anywhere in a system of shafting, and particularly in the equipment of automobiles driven by internal combustion engines. A further object is the production of a device of this general character in connection with one or more universal joints, whereby shock may be absorbed in a system of shafting the elements of which are out of alinement. A further object is the production of a device of the character just mentioned in which a limited relative longitudinal movement of the shock absorbing shaft sections may occur without interfering with the shock absorbing function of the device as a whole. A further object is the production of a device of this general character which is self-lubricating and without dangerous projections. With these and other objects not specifically mentioned in view, the invention consists in certain constructions and combinations which will be hereinafter fully described, and then specifically set forth in the claims hereunto appended.

Referring to the drawings which form a part of this specification and in which like characters of reference indicate the same or like parts, Figure 1 is a general view of a device constructed in accordance with the invention, Fig. 2 is a similar view, partly broken away, and Fig. 3 is a longitudinal sectional view.

In carrying the invention into effect, there is provided a shock absorbing shaft having a driving member, a driven member, and a resilient transmission mechanism engaging both members, whereby the shock of sudden change in relative speed of the members is absorbed by the transmission mechanism. All of these elements may vary in construction within wide limits. In the best constructions, the driving member and driven member consist of shaft sections mounted and relatively movable in alinement with each other, and the resilient transmission mechanism consists of a pair of relatively movable transmission members one carried by each section, and resilient means engaging said members and adapted to permit relative movement thereof only under excessive stress, and to return said members to normal position under normal or no stress.

The device selected to illustrate the invention is only one of many possible concrete embodiments of the invention, the one selected being particularly designed for use as a propeller shaft for automobiles. In the device illustrated, there is provided what may be termed a driving shaft section 1, and a driven shaft section 2, the two shaft sections being mounted and relatively movable in alinement with each other. It may be here remarked that the term driving shaft section, applied to the member 1, is for the purpose of description only; and that in certain constructions, the shaft section 2 may be the driving member, and the shaft section 1 may be the driven member. In other words, the device is designed to operate in either direction. One end of the driving shaft section 1 is squared at 3. The adjacent end of the driven shaft 2 is tapered and squared at 4. The shaft section 2 carries upon its squared end 4 what may be termed a transmission sleeve 5. This sleeve is held firmly and with an oil-tight joint upon the tapered end 4 of the shaft section 2 by means of a nut 6. This is a well known fastening means, and it is obvious that the sleeve 5 will rotate with the shaft section 2. The sleeve 5 projects beyond the squared end 3 of the driving shaft section 1, and at its extreme end is provided with a threaded head 7 carrying a stuffing box 8 of well known construction and journaled on the driving shaft section 1 beyond the squared end of said section. The head 7 and stuffing box 8 coöperate to form an oil-tight head, serving, in conjunction with the integral head of the sleeve engaging the tapered end 4 of the shaft section 2, to keep the interior of the sleeve 5 flooded with oil or other lubricant. The transmission sleeve 5 is provided with an internal thread 9.

A coöperating transmission member 10 is provided and located within the sleeve. This member is provided with an external thread 11 working in the internal thread 9 of the sleeve 5. It may be here remarked that the length of the transmission member 10 is sufficient to insure that its external thread 11 and that part of the internal thread 9 in engagement with the external thread 11 have strength enough to transmit all the power that the driving shaft section 1 is capable of transmitting. The transmission member 10 is further provided with a square hole 12, slidably engaging the squared end 3 of the driving shaft section 1, before referred to. Rotation of the driving shaft section 1 produces rotation of the transmission member 10, and the engagement of the threads 9 and 11 tends to produce a relative longitudinal movement of the sleeve 5 and transmission member 10.

Resilient means are provided for the purpose of holding the transmission member 10 in a central position within the sleeve 5 under no-load or normal load conditions, and for permitting a limited movement of the sleeve 5 and transmission member 10 under excessive stress. This means consists in a pair of springs 13 and 14, the spring 13 being coiled around the squared end 3 of the driving shaft section 1, and bearing against the integral head of the sleeve 5 and one side of the transmission member 10. Similarly, the spring 14 is coiled around the squared end 3 of the driving shaft section 1, and bears against the movable head 7 and the opposite side of the transmission member 10. These springs have sufficient power to resist relative movement of the sleeve 5 and the transmission member 10 under normal load conditions, but will yield under excessive stress, such as that produced by a sudden change in the relative speed of the shaft sections 1 and 2. It will be readily understood that the resistance of either spring to the movement of the transmission member 10 within the sleeve increases as compression of the spring increases; and that when the limit of spring compression is reached, the shaft section 2 will be driven positively. The transmission member 10 does not in all cases reach its extreme position. In some cases, the frictional contact of the internal thread 9 and the external thread 11, which frictional contact is produced and increased by the action of the spring, is sufficient to overcome the inertia of the driven shaft section, and to cause it to rotate at the same speed as the driving shaft section, before the transmission member 10 reaches its extreme position where it is positively locked to the driven shaft section. This construction enables the spring to absorb the shock during several turns of the driving shaft section, progressively but rapidly increasing the speed of the driven shaft section. Since the squared end 3 of the driving shaft section 1 is much longer than the movement of the transmission member 10 within the sleeve, it is apparent that the two shaft sections may relatively move in alinement, either while at rest or while rotating, without interfering in any way with the action of the shock absorbing mechanism. After the transmission member 10 has been caused to move from its normal position within the sleeve, by a sudden change in the relative speed of the driving shaft section and the driven shaft section, it is automatically caused to return to normal position by a reverse relative movement of the sleeve and transmission member, aided by the resiliency of the spring previously compressed. For example: If the driven shaft section is at rest and power is suddenly applied to the driving shaft section, one of the springs will be compressed by the action of the transmission member 10 in the thread of the sleeve. As hereinbefore explained, the driven shaft section will be caused to rapidly increase its speed, either by the driving frictional contact of the two threads aided by the spring, or positively when the spring is compressed to its limit. During this interval, the driven shaft section is rapidly acquiring momentum, and this momentum, aided by the resiliency of the spring, carries the driven shaft section and the sleeve a little beyond the speed of the driving shaft section, and thus produces a reverse action of the sleeve and transmission member 10 whereby the latter is returned to its normal position. It will be readily understood that, when both shaft sections are running at the same speed and a sudden change in the relative speed of the two sections takes place, the transmission members and spring will again be thrown into action, operating exactly as before described.

In the operation of the device, the sleeve is kept nearly full of oil or other lubricant.

When relative movement of the sleeve 5 and transmission member 10 takes place, the oil or other lubricant is displaced from one side of the transmission member 10, and must find its way to the other side of said member. With this end in view, the square hole 12 of the transmission member 10 is slightly larger than the squared end 3 of the driving shaft section 1, and a slight clearance is left between the internal thread 9 and the external thread 11. These slight clearances permit oil to pass along all the wearing surfaces of the mechanism, under pressure at every relative movement of the sleeve and transmission member.

The structure so far described is capable of use in any system of shafting where any sudden change in rotative speed takes place, and will operate to relieve said shafting of the excessive stress to which it would otherwise be subjected.

For the purpose of use as a propeller shaft in automobiles, where the alinement of the system of shafting is constantly changing, it is necessary to use one or more universal joints in connection with the shock absorbing shaft. With this end in view, the driving shaft section 1 is provided at its outer end with an integral universal joint member 15 in engagement with a coöperating universal joint member 16 formed integrally at one end of a shaft 17, which shaft is or may be the transmitting shaft of a motor or transmission gearing mechanism. This universal joint is further provided with a dust cup 18, held in engagement with the outer surface of the member 16 by means of a spring 19, and with a spring inclosing cup 20. Similarly, the driven shaft section 2 is provided at its outer end with an integral universal joint member 21 in engagement with a coöperating universal joint member 22 formed integrally on a shaft 23, which shaft is or may be the driving shaft of a differential gearing mechanism. This joint is provided with a dust cup 24, held against the universal joint member 22 by means of a spring 25 inclosed in a cup 26. The particular universal joints just described form the subject matter of a co-pending application, Serial No. 673,654, January 26, 1912, and reference is made to said application for a full disclosure of the details of said joints. For present purposes, it is sufficient to say that the working parts of each universal joint have sufficient strength to transmit all the power that can be transmitted by the shafts 17 and 23 and shaft sections 1 and 2, so that the joints and the shock absorbing mechanism are equal in strength to, or are stronger than, the shafts and shaft sections of the system. It will be readily understood that the shock absorbing shaft will perform its particular function irrespective of the space between said joints; that is to say, the joints may work at like angles, or at different angles, and may approach or recede from each other a limited distance without interfering in any way with the operation of the shock absorbing shaft or mechanism. It will be readily understood also that under a continuous excessive load; say, for instance, when the automobile is climbing a steep hill, the spring will remain compressed and the drive will be positive, but that as soon as the excessve load on the driving mechanism is removed, either by a change of transmission gearing from high gear to intermediate or low gear, or by the attainment of the summit of the hill, the transmission members will again return to their normal position.

Changes and variations may be made in the structure by means of which the invention is carried into effect. The invention, therefore, is not to be restricted to the precise details of the structure shown and described.

What is claimed is:

1. A shock absorbing shaft provided with a driving shaft section, and a driven shaft section adjacent and relatively rotatable in alinement with the driving shaft section, an internally threaded sleeve filled with a substantially incompressible fluid carried by one of said sections and projecting over the adjacent end of the other section, an externally threaded member engaging the thread of the sleeve and slidably engaging said second mentioned shaft section, said threaded member being constructed and arranged to permit the leakage of fluid from one side of it to the other, and a pair of springs interposed between the threaded member and the ends of the sleeve for returning the threaded member to its central position.

2. A shock absorbing shaft provided with a driving shaft section having a squared end, a driven shaft section adjacent and relatively movable in alinement with the driving shaft section, an internally threaded sleeve filled with a substantially incompressible fluid carried by the driven shaft section and projecting over the adjacent end of the driving shaft section and journaled on said section beyond its squared end, an externally threaded member engaging the thread of the sleeve and having a square hole slightly larger than and slidably engaging the squared end of the driving shaft section, and a pair of springs one coiled around the squared end of the driving shaft section on each side of the member and engaging the sleeve and member for returning the latter to its central position.

3. A shock absorbing shaft provided with a driving shaft section having a squared end, a driven shaft section adjacent and relatively movable in alinement with the driving shaft section, an internally threaded sleeve filled with a substantially incompressible fluid having an oil-tight head carried by the driven shaft section and a removable oil-tight head journaled on the driving shaft section beyond its squared end, an externally threaded member engaging the thread of the sleeve and having a square hole slidably engaging the squared end of the driving shaft section, and a pair of springs one coiled around the squared end of the driving shaft section on each side of the member and engaging the member and one of the sleeve heads for returning the threaded member to its central position.

4. A member, a hollow housing rotatably mounted thereon and arranged to form a closed chamber surrounding said member, a second member non-rotatably mounted on said first member within said housing and dividing said chamber into two compartments and arranged to move longitudinally upon relative rotation of said first member and said housing, one of said members being formed to provide a by-pass between said compartments, an incompressible fluid filling said housing.

In testimony whereof, I have signed my name to this specification in the presence of two subscribing witnesses.

HERBERT COOPER.

Witnesses:
 FRANK H. VICK, Jr.,
 SYDNEY I. PRESCOTT.